UNITED STATES PATENT OFFICE.

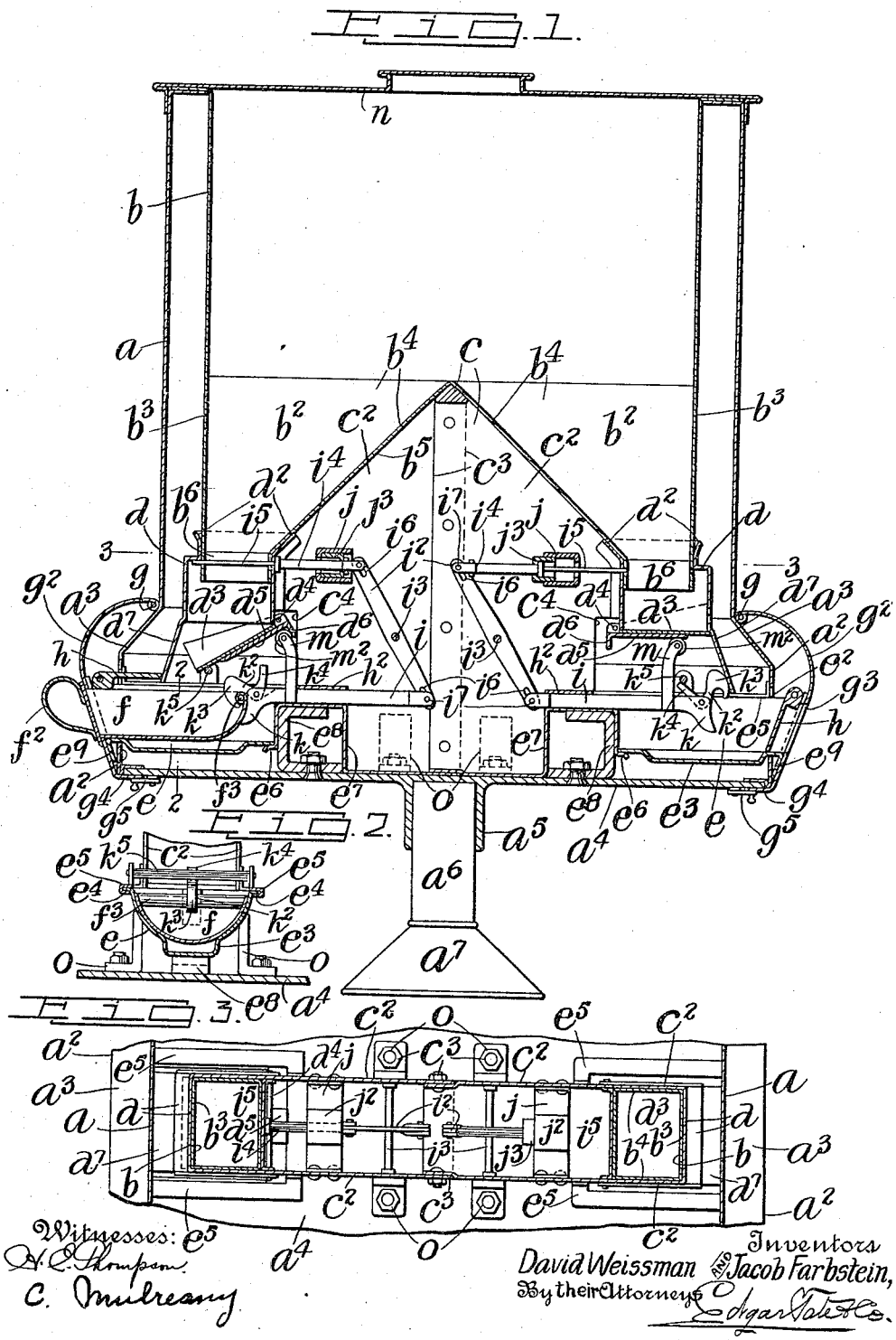

DAVID WEISSMAN AND JACOB FARBSTEIN, OF BROOKLYN, NEW YORK.

SUGAR-DISPENSING DEVICE.

1,183,509.   Specification of Letters Patent.   Patented May 16, 1916.

Application filed January 27, 1915. Serial No. 4,599.

*To all whom it may concern:*

Be it known that we, DAVID WEISSMAN and JACOB FARBSTEIN, respectively a subject of the Czar of Russia and a citizen of the United States, and residing at Brooklyn, in the county of Kings and State of New York, have invented certain new and useful Improvements in Sugar-Dispensing Devices, of which the following is a specification, such as will enable those skilled in the art to which it appertains to make and use the same.

This invention relates to sugar dispensing devices for use on dining room tables in hotels, restaurants and like places, and the object thereof is to provide an improved device of this class particularly designed for use in dispensing soft pulverized, powdered or ground sugar, and which may be provided with a base by which it may be secured on the table or which may be so made as to be movable on, or removable from the table when desired; a further object being to provide a device of the class specified which is simple in construction and operation; and with these and other objects in view the invention consists in a device of the class specified, constructed as hereinafter described and claimed.

The invention is fully disclosed in the following specification, of which the accompanying drawing forms a part, in which the separate parts of our improvement are designated by suitable reference characters in each of the views, and in which:—

Figure 1 is a sectional side view of our improved sugar dispensing device; Fig. 2 a partial section on the line 2—2 of Fig. 1; and, Fig. 3 a section on the line 3—3 of Fig. 1.

In the practice of our invention, as shown in the drawing, we provide a main casing $a$ which forms the main body part of our improved sugar dispensing device, and which may be of any desired dimensions and any preferred form in cross section but preferably square, and the bottom portion of the body of the casing is enlarged as shown at $a^2$ to form a beveled shoulder $a^3$ which extends entirely around said body, and the casing or body is provided with a bottom $a^4$ having a central downwardly directed tubular neck piece $a^5$ adapted to receive the standard $a^6$ of a base $a^7$, and the body may be detachable from the base $a^7$, and said base $a^7$ may be of any preferred dimensions, and by means thereof the sugar dispensing device, may, if desired, be secured to a table or other support or said device may be movable on, or removable from the table or other support on which it is placed.

Within the main body or casing $a$ is placed a detachable supplemental casing $b$, the opposite sides of which are provided in the bottom thereof with oppositely arranged hoppers $b^2$, the outer walls of which are straight as shown at $b^3$, and the side and inner walls of which are inclined as shown at $b^4$ and $b^5$ and formed into discharge necks $b^6$.

The supplemental inner casing $b$ is removable and is provided with a central bottom support $c$ composed of two side plates $c^2$ integrally connected at the bottom. The support $c$ is also divided centrally, vertically and transversely into two separate similar parts as shown at $c^3$, and the opposite edges of the side plates $c^2$ of said parts are cut out as shown at $c^4$. The necks $b^6$ of the hoppers $b^2$ enter sugar receptacles $d$ arranged in the opposite sides of the bottom portion of the body, and said receptacles are preferably formed integrally with the plates $c^2$. The receptacles $d$ are open at the top and provided with outwardly flaring necks $d^2$, and the bottoms of said receptacles are open and provided with chute doors $d^3$ which are pivoted rearwardly of the bottoms of said receptacles as shown at $d^4$, and secured to the bottoms of said doors are bearing plates $d^5$ provided at their inner ends with downwardly directed lips $d^6$, and at the outer sides of the bottom of the receptacles $d$ are downwardly and outwardly directed shields $d^7$.

Below the receptacles $d$ and in the enlarged bottom portion $a^2$ of the body are drawer receptacles $e$ adapted to receive drawers $f$, and the drawer receptacles $e$ open outwardly through the body portion $a^2$ as shown at $e^2$, and the drawers $f$ are provided at their outer ends with handles $f^2$ and the tops thereof are provided at their inner ends with transverse beads $f^3$.

The drawer receptacles $e$ are trough-shaped in cross section as shown in Fig. 2 and provided with depressed bottoms $e^3$, the top side edges of said receptacles are provided with flanges $e^4$ adapted to enter corresponding keepers $e^5$ preferably formed integrally with the plates $c^2$, and the receptacles $e$ are open at both ends and the inner ends thereof are provided with supports $e^6$ formed integrally with the plates $c^2$, or the bottom portions thereof, said supports consisting of outwardly directed lips formed integrally with yoke-shaped members $e^7$ cut from the bottom portions of the plates $c^2$, or the supports $c$ formed by said plates, and placed in the yoke-shaped members $e^7$ are supplemental yoke-shaped supports $e^8$ which are secured to the bottom $a^4$ of the body of the device.

The outer ends of the receptacles $e$ are provided with projecting heads $e^9$ which are open at the top, and pivoted to the opposite sides of the body at $g$ are shields $g^2$ which are adapted to cover the drawer receptacles $e$ and which are provided with openings $g^3$ through which the drawers $f$ are inserted, and said shields are provided at their bottom edges with inwardly directed flanges $g^4$, and pivoted to the bottom $a^4$ are catches $g^5$ adapted to engage said flanges so as to hold said shields in a closed position.

In the accompanying drawing the left hand drawer $f$ is shown in position, while the right hand drawer is not shown, and pivoted to the shields $g^2$ at the top of the openings $g^3$ therein are doors $h$ which are raised by the insertion of the drawers as shown at the left of Fig. 1, and which drop down and close the receptacles $e$ when said drawers are withdrawn.

Inwardly of the drawer receptacles are arranged horizontal keepers $h^2$ in which are mounted horizontally movable bars $i$ with the inner ends of which are connected levers $i^2$ pivoted at $i^3$, and with the upper ends of which are connected horizontally movable bars $i^4$ which are connected with shutter doors $i^5$ movable horizontally through the necks $b^6$ of the hoppers $b^2$. The levers $i^2$ are provided both at their lower and upper ends with longitudinal slots $i^6$ and the members $i$ and $i^4$ are provided with pins $i^7$ which pass through said slots.

Secured transversely between the plates $c^2$ are keepers $j$ which have central members $j^2$ which open inwardly and mounted on the inner ends of the bars $i^4$ are thimble-shaped or sleeve-shaped bearings $j^3$ movable in said keepers and the object of this construction is to guide the movements of the bars $i^4$ and the shutter doors $i^5$ in their operation as hereinafter described.

The outer ends of the bars $i$ are provided with downwardly directed nose pieces $k$, and pivoted to said ends are pawls $k^2$ having downwardly directed hook members $k^3$ adapted to engage the beads $f^3$ at the inner ends of the drawers $f$, and said pawls are also provided with upwardly directed fingers $k^4$ adapted to operate in connection with transverse stop pins $k^5$ arranged over the drawer receptacles $e$, and which also form supports for the chute doors $d^3$ and limit the downward movement thereof. The bars $i$ are also provided inwardly of their outer ends with upwardly directed arms $m$ provided with rollers $m^2$ in the top thereof and which, in the operation of the device as hereinafter described, bear on the bottoms of the chute doors $d^3$ or on the plates $d^5$ secured thereto.

The drawer receptacles $e$ are removable in order that the same may be cleaned when desired, and the downwardly directed extensions at the bottom of said drawer receptacles form supplemental receptacles to receive any sugar that may be spilled into said receptacles in the operation of the device.

The inner supplemental casing $b$ which forms a container for the sugar to be dispensed is made removable to facilitate the cleaning thereof, when desired, and the body $a$ and said container are provided with a removable cover $n$.

The operation of the device will be readily understood from the foregoing description when taken in connection with the accompanying drawing and the following statement thereof. In the normal position of the parts with the drawers $f$ withdrawn the shutter doors $i^5$ are open and the chute doors $d^3$ closed as indicated at the right of Fig. 1. If now the drawers be inserted the doors $h$ will be raised as shown at the left of Fig. 1, and in the backward movement of the drawers the rear ends thereof will strike the nose pieces $k$ of the bars $i$, and said bars will be forced inwardly and the bars $i^4$ will be forced outwardly, and the doors $i^5$ will be closed as shown at the left of Fig. 1. In the position of the parts, as shown at the right of Fig. 1, the fingers $k^4$ of the pawls $k^2$ engage the cross pins $k^5$ and the hook members $k^3$ are held in their raised position, and as the drawers are inserted the inner ends thereof strike the nose pieces $k$ of the bars $i$ and force said bars inwardly, and in this operation the hook members $k^3$ of the pawls $k^2$ drop down or are forced down by the pins $k^5$ and engage the beads $f^3$ at the inner ends of the drawers $f$ as shown at the left of Fig. 1. In this operation the arms $m$ which are secured to the bars $i$ and which, in the position shown at the right of Fig. 1, hold the chute doors $d^3$ closed, also move inwardly, and said doors drop into the open position as shown at the left of Fig. 1, and the sugar in the receptacles $d$ drops into the drawers. In the above described operation the bars $i^4$ are also forced inwardly by the levers $i^2$ and the shutter doors $i^5$ are closed before the sugar drops into the drawers or before the doors $d^3$ are open. In the withdrawal of the drawers the above operation is reversed, or the chute doors $d^3$ are first closed after which the shutter doors $i^5$ are open, and when the drawers are again inserted the pawls $h^2$ again drop into the position shown at the left of Fig. 1 and engage the inner ends of said drawers, and the above operation or operations may be repeated as often as, or whenever desired at either side of the device.

The framework consisting of the plates $c^2$ and connected parts which form a receptacle, in which the operative parts $i$, $i^2$, $i^4$, etc., are placed, is detachable to facilitate the cleaning and repairing of the various parts when desired, and this framework is held in place by keepers $o$, and the yoke-shaped members $e^8$, said keepers being secured to the bottom $a^4$ of the device.

Although, we have described our improvement as particularly applicable to dispensing sugar it will be understood that any other finely divided product may be similarly dispensed, if desired, and while we have shown and described, in detail, the various parts of the operative mechanism of our improvement and the method of assembling the same, our invention is not limited to the details of construction herein described, and changes therein and modifications thereof may be made, within the scope of the appended claims, without departing from the spirit of our invention or sacrificing its advantages.

Having fully described our invention, what we claim as new and desire to secure by Letters Patent, is:—

1. In a device of the class described, a hopper provided with a discharge, a receptacle into which said discharge opens, the discharge of the hopper and the receptacle being provided with doors, a drawer holder beneath said receptacle, a drawer adapted to be inserted into and removed from said holder, and means whereby the insertion of said drawer will operate the first named door to close the discharge of the hopper and then open the door of the receptacle and whereby the withdrawal of the drawer will first close the door of the receptacle and then open the door of the discharge of the hopper.

2. A device of the class described provided with hoppers having oppositely arranged discharges, receptacles with which said discharges communicate, sliding doors for closing said discharges, hinged doors for closing the bottoms of said receptacles, drawer holders arranged beneath said receptacles, drawers adapted to be inserted into said holders, and means whereby the insertion of said drawers will operate the first named doors to close the discharges of the hoppers and the second named doors to open said receptacles, and whereby the withdrawal of said drawers will first operate the doors to close said receptacles and then operate the doors to open the discharges of the hoppers.

3. A device of the class described, comprising a hopper having a discharge, a receptacle with which said discharge communicates, a removable drawer holder, a door for closing the discharge of the hopper, a door for closing said receptacle, a drawer adapted to be inserted into or removed from said holder, and devices whereby the insertion of the drawer will operate the first named door to close the discharge of the hopper and open the last named door to open said receptacle, and whereby the withdrawal of the drawer will first close the receptacle door and then open the door of the discharge of the hopper.

4. A device of the class described, comprising a hopper having a discharge, a receptacle with which said discharge communicates, a removable drawer holder, a door for closing the discharge of the hopper, a door for closing said receptacle, a drawer adapted to be inserted into and removed from said holder, and devices whereby the insertion of the drawer will operate the first named door to close the discharge of the hopper and open the last named door to open said receptacle, and whereby the withdrawal of the drawer will first close the receptacle door and then open the door of the discharge of the hopper, said devices comprising a longitudinally movable bar mounted over said drawer holder and adapted to engage said drawer, an arm connected with said bar and operating in connection with the door of the receptacle, and a lever pivoted to the inner end of said bar and adapted to operate the door of the discharge of the hopper.

5. In a device of the class described, a suitable casing, a hopper provided with a discharge, a receptacle into which said discharge opens, a removable drawer placed in said casing below said receptacle, and means whereby the insertion and removal of the drawer will open and close the discharge of the hopper and open and close said receptacle, substantially as shown and described.

In testimony that we claim the foregoing as our invention we have signed our names in presence of the subscribing witnesses this 23rd day of January, 1915.

DAVID WEISSMAN.
JACOB FARBSTEIN.

Witnesses:
C. MULREANY,
H. C. THOMPSON.